(No Model.)

J. COCHEU.
DEVICE FOR CLEANING SLATES.

No. 352,946. Patented Nov. 23, 1886.

Witnesses:
Thos. Clifford
George W. Page

Inventor:
Jacob Cocheu

UNITED STATES PATENT OFFICE.

JACOB COCHEU, OF BROOKLYN, NEW YORK.

DEVICE FOR CLEANING SLATES.

SPECIFICATION forming part of Letters Patent No. 352,946, dated November 23, 1886.

Application filed September 7, 1886. Serial No. 212,969. (No model.)

*To all whom it may concern:*

Be it known that I, JACOB COCHEU, a citizen of the United States, and a resident of Brooklyn, county of Kings, and State of New York, have invented a new and useful Improvement in a Device for Cleaning Slates, reference being had to the accompanying drawings, of which the following is a specification.

The object of my invention is a device for cleaning slates, which is made of material not easily destroyed, having the peculiarity of holding together absorbents and a reservoir in a compact and convenient form, and, if desired to be carried as a watch, it may be placed in a case of that form. It is described in the accompanying drawings.

Figure 1:
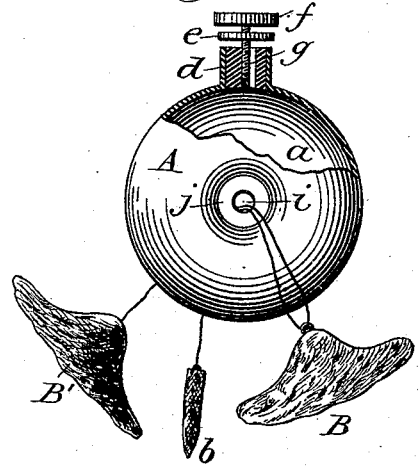
Figure 2:
Figure 3:
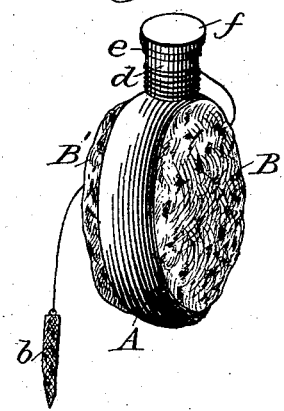

Figure 1 is a front view showing upper broken part in section. Fig. 2 is a top view of stopper. Fig. 3 is a three-quarter view of the article complete.

In Fig. 1, A is the outside view of the lower portion of an annular elastic tubular reservoir for holding water or other cleansing-fluid, and encircles absorbents B B'.

$a$ is the interior of reservoir.

B B' are absorbents for taking up moisture, and are removed preparatory to filling reservoir.

$b$ is an absorbent or elastic finger for erasing minute parts.

$d$ is a stopper shown in section in neck of reservoir; $e$, an elastic washer.

$f$ is a thumb-screw, which passes through washer $e$ and takes into a thread on the interior of stopper $d$, and when closed compresses $e$ against top of $d$, rendering it water-tight.

$g$ is a slot in $d$, passing directly alongside of screw $f$ as it enters stopper $d$, through which the water flows if $e$ be released and A slightly pressed.

$i$ is a perforation in center disk, $j$.

$j$ is a disk in center of (and part of) A.

$k$ is a string attached to absorbent B', and passing through $i$, then through a loop in B, back through $i$, and then drawn to its fullest extent and caught by a clove hitch or any suitable knot around the outside of reservoir-neck, thereby bringing and holding together absorbents B B' in contact with center disk, $j$, ready for use, as shown in Fig. 3.

I claim as my invention—

The annular tubular elastic reservoir provided with the pieces B B' $b$, of absorbent material, adjustable substantially as described, and a stopper having an aperture and adjustable washer.

In testimony that I claim the foregoing as my invention I have signed my name, in presence of two witnesses, this 6th day of September, 1886.

JACOB COCHEU.

Witnesses:
 THOS. B. CLIFFORD,
 GEORGE W. PAGE.